(12) United States Patent
Russell et al.

(10) Patent No.: US 12,036,505 B2
(45) Date of Patent: Jul. 16, 2024

(54) THREE-PRODUCT PRESSURE SWING ADSORPTION SYSTEM

(71) Applicant: UOP LLC, Des Plaines, IL (US)

(72) Inventors: Bradley Russell, Carol Stream, IL (US); William Cady, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 448 days.

(21) Appl. No.: 17/451,935

(22) Filed: Oct. 22, 2021

(65) Prior Publication Data

US 2022/0305427 A1    Sep. 29, 2022

Related U.S. Application Data

(60) Provisional application No. 63/167,334, filed on Mar. 29, 2021.

(51) Int. Cl.
*B01D 53/047* (2006.01)
*B01D 53/04* (2006.01)
(Continued)

(52) U.S. Cl.
CPC ....... *B01D 53/047* (2013.01); *B01D 53/0454* (2013.01); *B01D 2253/102* (2013.01);
(Continued)

(58) Field of Classification Search
CPC .. B01D 53/047; B01D 53/04; B01D 53/0454; B01D 2253/102; B01D 2253/108; B01D 2256/16; B01D 2257/102; B01D 2257/502; B01D 2257/504; B01D 2259/40003; B01D 2259/40007; B01D 2259/40015; B01D 2259/4002; B01D 2259/40047; B01D 2259/4005; B01D 2259/40075; B01D 2259/40079; B01D 2259/40081; B01D 2259/403; B01D 2257/7025;
(Continued)

(56) References Cited

U.S. PATENT DOCUMENTS 4,300,009 A    11/1981  Haag et al.
4,705,541 A *  11/1987  Sircar .................. B01D 53/047
                                                    95/98

(Continued)

FOREIGN PATENT DOCUMENTS

FR    2961802 A1    12/2011
WO    2007123673 A1    11/2007
WO    2019133598 A1    7/2019

OTHER PUBLICATIONS

International Search Report from PCT application No. PCT/US2022/071386 mailed Jul. 13, 2022.
(Continued)

*Primary Examiner* — Frank M Lawrence, Jr.

(57) ABSTRACT

A three-product PSA system which produces three product streams from a feed gas mixture comprising a light key component, at least one heavy key component, and at least one intermediate key component is described. The three-product PSA system produces a high pressure product stream enriched in the light key component, a low pressure tail gas stream enriched in the at least one heavy key component, and an intermediate pressure vent gas stream enriched in the at least one intermediate key component.

16 Claims, 3 Drawing Sheets

(51) Int. Cl.
   *C01B 3/24* (2006.01)
   *C01B 3/56* (2006.01)
(52) U.S. Cl.
   CPC .... *B01D 2253/108* (2013.01); *B01D 2256/16* (2013.01); *B01D 2257/102* (2013.01); *B01D 2257/502* (2013.01); *B01D 2257/504* (2013.01); *B01D 2259/40003* (2013.01); *B01D 2259/40007* (2013.01); *B01D 2259/40015* (2013.01); *B01D 2259/4002* (2013.01); *B01D 2259/40047* (2013.01); *B01D 2259/4005* (2013.01); *B01D 2259/40075* (2013.01); *B01D 2259/40079* (2013.01); *B01D 2259/40081* (2013.01); *B01D 2259/403* (2013.01)
(58) Field of Classification Search
   CPC ........... B01D 2259/40039; B01D 2259/40043; C01B 3/56; C01B 2203/0233; C01B 2203/0244; C01B 2203/0283; C01B 2203/0415; C01B 2203/043; C01B 2203/0475; C01B 2203/0827; C01B 2203/1241; C01B 2203/142; C01B 2203/146
   USPC ..... 95/96, 97, 100, 103, 127, 130, 139, 140, 95/141, 144, 147; 96/121
   See application file for complete search history.

(56) References Cited

U.S. PATENT DOCUMENTS

| | | |
|---|---|---|
| 4,772,420 A | 9/1988 | Pinto et al. |
| 4,963,339 A | 10/1990 | Krishnamurthy et al. |
| 4,992,605 A | 2/1991 | Craig et al. |
| 5,133,785 A * | 7/1992 | Kumar ............... B01D 53/0476 95/143 |
| 6,875,008 B1 | 4/2005 | Martin et al. |
| 7,999,142 B2 | 8/2011 | Kalnes et al. |
| 8,021,464 B2 | 9/2011 | Gauthier et al. |
| 8,039,682 B2 | 10/2011 | McCall et al. |
| 8,198,492 B2 | 6/2012 | Brady et al. |
| 8,241,400 B2 * | 8/2012 | Grover .................... C01B 3/382 95/143 |
| 8,394,174 B2 | 3/2013 | Chen et al. |
| 8,431,755 B2 | 4/2013 | Vauk |
| 8,742,183 B2 | 6/2014 | McCall et al. |
| 8,865,953 B2 | 10/2014 | Brady et al. |
| 9,062,258 B2 | 6/2015 | Mayeur et al. |
| 2004/0230085 A1 | 11/2004 | Jakkula et al. |
| 2010/0288123 A1 | 11/2010 | Chen et al. |
| 2012/0121497 A1 | 5/2012 | Terrien et al. |
| 2015/0376801 A1 | 12/2015 | Bairamijamal |
| 2016/0250580 A1 | 9/2016 | Monereau et al. |
| 2016/0312125 A1 | 10/2016 | Linck |
| 2018/0216010 A1 | 8/2018 | Hong |
| 2019/0135626 A1 | 5/2019 | Rafati et al. |
| 2019/0275460 A1* | 9/2019 | Zhong ................ B01D 53/0476 |

OTHER PUBLICATIONS

Written Opinion from PCT application No. PCT/US2022/071386 mailed Jul. 13, 2022.
International Search Report from PCT application No. PCT/US2022/071388 mailed Jul. 14, 2022.
Written Opinion from PCT application No. PCT/US2022/071388 mailed Jul. 14, 2022.
Kraus, Kurt el al., U.S. Appl. No. 17/451,932 entitled *Active and Passive Combustion Stabilization for Burners for Highly and Rapidly Varying Fuel Gas Compositions filed on Oct. 22, 2021.
International Search Report from PCT application No. PCT/US2022/071385, mailed on Jul. 6, 2022.
International Search Report from corresponding PCT application No. PCT/US2022/071384, mailed on Jul. 6, 2022.
International Preliminary Report from corresponding PCT application No. PCT/US2022/071384 issued Oct. 3, 2022.

* cited by examiner

THREE-PRODUCT PRESSURE SWING ADSORPTION SYSTEM

RELATED APPLICATIONS

This application claims priority to U.S. Provisional Patent Application Ser. No. 63/167,334 filed on Mar. 29, 2021, the entirety of which is incorporated herein by reference.

BACKGROUND

Hydrogen is expected to have significant growth potential because it is a clean-burning fuel. However, hydrogen production is traditionally a significant emitter of $CO_2$, and government regulations and societal pressures are increasingly taxing or penalizing $CO_2$ emissions. Consequently, significant competition to lower the cost of hydrogen production while recovering the byproduct $CO_2$ for subsequent geological sequestration to capture the growing market is anticipated. $CO_2$ can be separated as a vapor to be supplied to a common pipeline, but more likely it will need to be produced in liquefied form for easy transport by truck or ship due to the current lack of $CO_2$ pipeline infrastructure in certain areas of the world.

In some applications, greater than 95% $CO_2$ capture from steam reforming or autothermal reforming or greater than 90% including $CO_2$ impact from utilities is desired, and may soon be required. However, even lower $CO_2$ capture percentages from hydrogen production plants, such as 50% to 60%, can be desirable from an economic perspective, especially when the $CO_2$ recovery system is retrofitted to an existing steam reforming plant. In such cases, $CO_2$ can be economically recovered from the shifted syngas (pre-combustion capture). In addition to steam reforming hydrogen plants, syngas $CO_2$ capture can also be desirable in other hydrocarbon or fossil fuel conversion processes, such as autothermal reforming (ATR), gasification, or partial oxidation (PDX).

Most existing hydrogen production processes utilize pressure swing adsorption (PSA) to recover high-purity product hydrogen from shifted syngas. The low-pressure tail gas stream from the PSA unit is typically combusted to generate heat or steam for the process. If no stream is sent to a combustor, purge is required to prevent impurity build-up in the process.

U.S. Pat. No. 8,021,464 describes a process for the combined production of hydrogen and $CO_2$ from a mixture of hydrocarbons which are converted to syngas. The syngas is separated in a PSA unit into a hydrogen-enriched stream and a PSA offgas stream. The PSA offgas is compressed and dried, followed by several successive steps of condensing and separating the $CO_2$-rich condensate with the temperature being reduced at each step, the temperature ranging from ambient to $-56°$ C. However, the process results in a purge stream containing a significant amount of $CO_2$ which must be removed from the process. A permeate module can be used to improve the separation, but at the cost of increased power requirements.

U.S. Pat. No. 8,241,400 describes a process for recovering hydrogen and $CO_2$ from a mixture of hydrocarbons utilizing a system that includes a reformer unit, an optional water gas shift reactor, a PSA unit, and a cryogenic purification unit or a catalytic oxidizer. The PSA unit produces three streams: a high pressure hydrogen stream, a low pressure $CO_2$ stream, and a $CH_4$ rich stream which is withdrawn during a $CO_2$ co-purge step. Purified $CO_2$ from the $CO_2$ purification unit in the process is used as the co-purge in the PSA unit. The adsorption step is run at a pressure of about 250 psig to about 700 psig. The pressure during the co-purge step is in the range of about 300 psig to about 800 psig, and the $CO_2$ co-purge stream is preferably introduced at a pressure higher than the pressure during the adsorption step.

The use of a second high-pressure feed stream (the $CO_2$ co-purge stream) increases the cost and complexity of the process in U.S. Pat. No. 8,241,400. The necessity of having a segmented adsorber (or two separate vessels) with an isolation valve between the two and an intermediate side-draw further increases the cost and complexity of the process.

Therefore, there is a need for improved hydrogen separation processes with improved, cost-effective $CO_2$ recovery.

DETAILED DESCRIPTION

Figure 1:
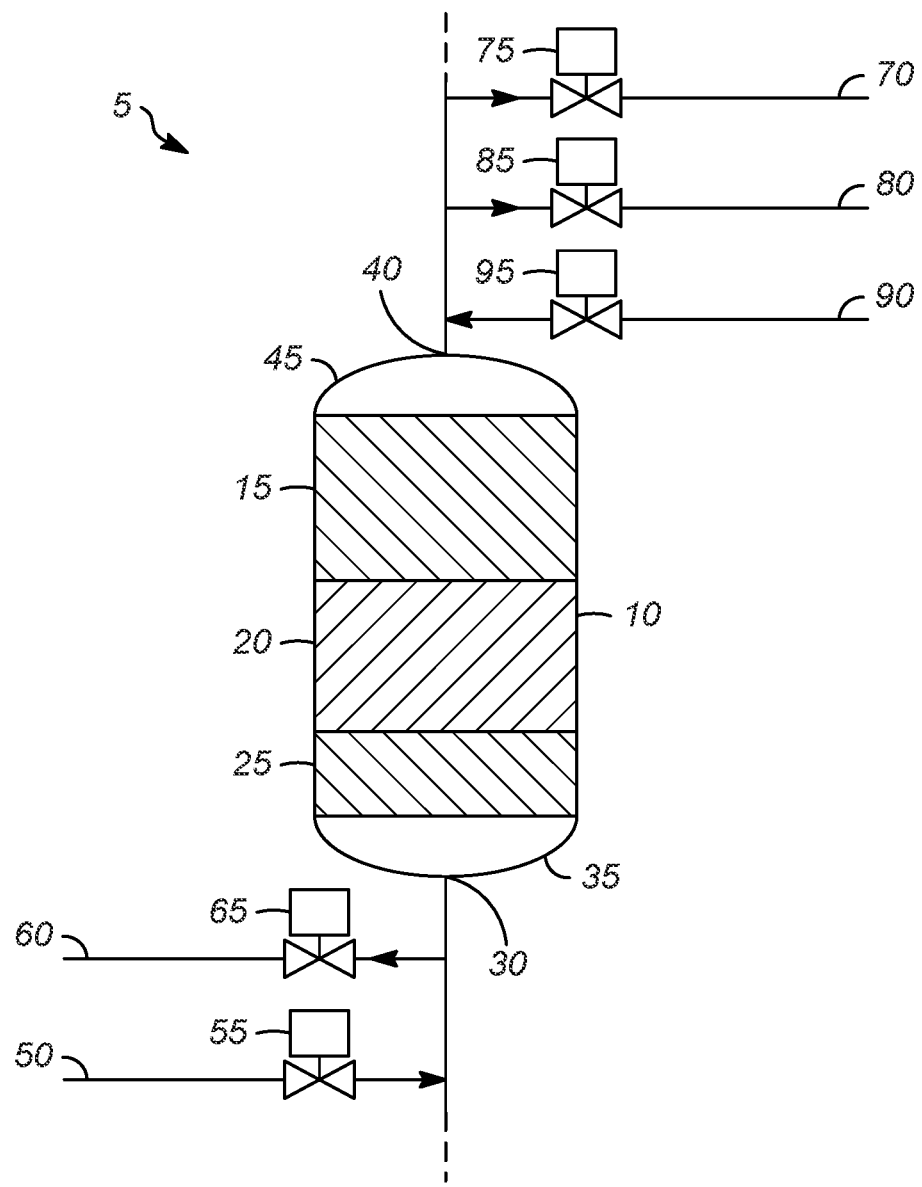
FIG. 1 is an illustration of one embodiment of a three-product PSA unit for use in the three-product PSA system of the present invention.

The three-product PSA system produces three product streams from a feed gas mixture comprising a light key component, at least one heavy key component, and at least one intermediate key component. The three-product PSA system produces a high pressure product stream enriched in the light component, a low pressure tail gas stream enriched in the at least one heavy key component, and an intermediate pressure vent gas stream enriched in the at least one intermediate key component. The light component is the most weakly adsorbing species, and the heavy component is the most strongly adsorbing species, with the intermediate component in between the light and heavy components. The light and heavy components do not necessarily correspond to molecular weight.

The three-product PSA unit comprises a PSA adsorption vessel. There are generally at least six vessels, and typically eight to fourteen vessels. The vessels comprise one or more adsorbent layers, generally one to five, and typically two to three. The percentage of the bed for an adsorption layer is typically between 10% and 100%. Different layers of adsorbent have different selectivity for the components in the overhead stream, as is known to those skilled in the art. For example, with a hydrogen production process and recovery of $CO_2$, some layers contain adsorbent that is for selective adsorption of $CO_2$ relative to methane, carbon monoxide, nitrogen, argon, and hydrogen, including, but not limited to, layers of activated alumina, silica gel, and sodium Y zeolite. Other layers contain adsorbent that is for selective adsorption of $CO_2$, methane, carbon monoxide, nitrogen, and argon relative to hydrogen, including, but not limited to, layers of activated carbon, silica gel, and molecular sieve zeolite (e.g., 5 A or sodiumxzeolite). Those of skill in the art will appreciate that other zeolites could be used and will know how to select appropriate adsorbents.

There is a first opening at one end of the vessel, and a second opening at the opposite end. For convenience, the ends will be referred to as the top and the bottom of the vessel. The first opening at the bottom is selectively connected to a high pressure feed gas inlet line, and a low pressure tail gas outlet line. The second opening at the top of the vessel is selectively connected to a high pressure product outlet line, an intermediate pressure vent gas outlet line, and a low pressure purge gas inlet line.

The feed gas enters at high pressure through the first opening at the bottom of the vessel, and a high pressure, co-current adsorption and product removal step takes place with the product exiting the vessel at high pressure through the second opening at the top of the vessel. There is at least one co-current depressurization step, and then an intermediate pressure co-current depressurization and vent gas removal step. The intermediate key component is removed through the opening at the top at an intermediate pressure. There is a counter-current blowdown step and a counter-current purge step. The purge gas enters through the opening at the top of the vessel at low pressure. The heavy key component can be removed at low pressure through the opening at the bottom of the vessel during either or both of the counter-current blowdown step and the counter-current purge step. There is at least one counter-current re-pressurization step following the counter-current purge and tail gas removal step.

The three-product PSA unit of the present invention provides several advantages. The intermediate key component is not removed at high pressure. Instead, it is removed an intermediate pressure between the high pressure at which the light key component is removed and the low pressure at which the heavy key component is removed, but it much closer to the low pressure than to the high pressure. The intermediate pressure is typically less than about 450 kPa.

In addition, no high pressure co-purge stream is used. Furthermore, the vessel is not segmented; the intermediate key component is withdrawn through the opening in the top of the vessel. Therefore, there is no need for an isolation valve and a side draw outlet between two adsorbent beds. These factors make the thee-product PSA unit much less complex and less expensive to build and operate than the PSA and process of U.S. Pat. No. 8,241,400.

The source of the feed gas mixture can be any process stream comprising a light key component, at least one heavy key component, and at least one intermediate key component. Suitable process streams include, but are not limited to, process streams from new and existing hydrogen production processes such as steam reforming, ATR, gasification, or partial oxidation (PDX). Other suitable process streams can be hydrogen containing byproduct streams from petroleum refineries, such as fluidized catalytic cracking (FCC) off gas.

One aspect of the invention is a method of separating a feed gas mixture comprising a light key component, at least one heavy key component, and at least one intermediate key component, In one embodiment, the method comprises: introducing the feed gas mixture to a three-product pressure swing adsorption (PSA) system having a PSA cycle, the three-product PSA system comprising a three-product PSA unit; removing a high-pressure product stream enriched in the light key component, wherein the high-pressure product stream is substantially free of the at least one intermediate key component and the at least one heavy key component; removing an intermediate-pressure vent gas stream enriched in the at least one intermediate key component through an opening at the top of the PSA unit; and removing a low-pressure tail gas stream enriched in the at least one heavy key component through an opening at the bottom of the vessel.

In some embodiments, removing the high-pressure product stream comprises removing the high-pressure product stream during a high pressure, co-current adsorption step in the PSA cycle; removing the intermediate-pressure vent gas stream during an intermediate pressure co-current depressurization step in the PSA cycle; and removing the low-pressure tail gas stream during at least one of a counter-current depressurization step, and a counter-current purge step in the PSA cycle.

In some embodiments, the PSA cycle comprises:
a high pressure, co-current adsorption and product removal step;
at least one co-current depressurization step following the high pressure, co-current adsorption step and product removal step;
an intermediate pressure co-current depressurization and vent gas removal step following the at least one co-current depressurization step;
a counter-current blowdown step and tail gas removal step following the intermediate pressure co-current depressurization and vent gas removal step;
a counter-current purge and tail gas removal step following the counter-current blowdown step; and
at least one counter-current re-pressurization step following the counter-current purge and tail gas removal step.

In some embodiments, the PSA cycle further comprises: a co-current feed re-pressurization step following the at least one counter-current re-pressurization step or a counter-current product re-pressurization following the at least one counter-current re-pressurization step.

The high pressure product stream is typically removed at a high pressure in the range of about 1,000 to about 6,000 kPa, or about 2,000 kPa to about 5,000 kPa, or about 2,500 kPa to about 4,500 kPa.

The temperature of the incoming feed gas mixture is typically in the range of about 20° C. to about 60° C., or about 30° C. to about 50° C., or about 40° C. (or any combination of temperature ranges).

The concentration of the light key component in a conventional two-product PSA feed gas is generally in the range of about 60 mol % to about 90+ mol %. For example, the hydrogen concentration in a feed stream to a hydrogen PSA unit is typically about 70 mol % to about 80 mol %. It is generally accepted that it will be difficult to process a feed stream having a hydrogen concentration of less than 50 mol % in a PSA unit.

In contrast, the hydrogen concentration in the feed gas mixture to the three-product PSA unit of the present invention is generally in the range of about 20 mol % to about 60 mol %. For example, the hydrogen concentration in a $CO_2$ distillation column overhead gas within a $CO_2$ recovery system on a steam reforming plant tail gas is about 30 mol % to about 50 mol %, while the hydrogen concentration in fluid catalytic cracking (FCC) off-gas is about 20 mol % to about 40 mol %.

About 80% to 90% of the light key component in the feed gas mixture is typically recovered in the high pressure product stream, and this high pressure product stream is substantially free of the heavy key and intermediate key components. It typically contains less than about 1% of the heavy key component relative to the feed gas mixture, or less than about 0.1%, or less than about 0.01%. It typically contains less than about 10% of the intermediate key components relative to the feed gas mixture, or less than about 5%, or less than about 2%, or less than about 1%, or less than about 0.1%.

The low pressure product stream is typically removed at a low pressure in the range of about 50 kPa to about 250 kPa, or about 100 kPa to about 200 kPa.

The low pressure product stream typically contains about 95% to 100% of the heavy key component in the feed gas mixture. It typically contains about 10% of the light key component relative to the feed gas mixture (e.g., about 5% to about 15%), and about 40% of the intermediate key components relative to the feed (e.g., about 20% to about 60%).

The intermediate pressure product stream is removed at an intermediate pressure between the high pressure and the low pressure. The intermediate pressure is much closer to the low pressure than the high pressure, typically within about 400 kPa of the low pressure, or 300 kPa, or 200 kPa. Typically, the intermediate pressure product stream is removed at a pressure in the range of about 150 kPa to about 450 kPa, or about 250 kPa to about 350 kPa.

Although there is some overlap between the intermediate pressure range and the low pressure range, it is understood that in a particular case, the low pressure will be lower than the intermediate pressure.

The intermediate pressure vent gas stream typically contains about 40% to 80% of the intermediate key component in the feed gas mixture. It typically contains about 10% of the light key component relative to the feed gas mixture (e.g., about 5% to about 25%), and less than about 5% of the heavy key components relative to the feed, or less than about 1%, or less than about 0.1%.

In some embodiments, the light key component is hydrogen.

In some embodiments, the heavy key component is at least one of carbon dioxide and ethylene.

In some embodiments, the intermediate key component is at least one of methane, carbon monoxide, nitrogen, and argon.

In some embodiments, the light key component is hydrogen; the heavy key component is at least one of carbon dioxide and ethylene; and the intermediate key component is at least one of methane, carbon monoxide, and nitrogen, and argon.

Another aspect of the invention is a method of separating a feed gas mixture comprising hydrogen, at least one of carbon dioxide and ethylene, and at least one of methane, carbon monoxide, nitrogen, and argon comprising: introducing the feed gas mixture to a three-product pressure swing adsorption (PSA) system having a PSA cycle, the three-product PSA system comprising a three-product PSA unit; removing a high-pressure product stream enriched in the hydrogen, wherein the high-pressure product stream is substantially free of the at least one of the carbon dioxide and the ethylene, and the at least one of the methane, the carbon monoxide, the nitrogen, and the argon; removing an intermediate-pressure vent gas stream enriched in the at least one of the carbon monoxide, methane, nitrogen, and argon through an opening at the top of the PSA unit; and removing a low-pressure tail gas stream enriched in the at least one of the carbon dioxide or ethylene.

In some embodiments, removing the high-pressure product stream comprises removing the high-pressure hydrogen stream during a high pressure, co-current adsorption step in the PSA cycle; wherein removing the intermediate-pressure vent gas stream comprises removing the intermediate-pressure vent gas stream during an intermediate pressure co-current depressurization step in the PSA cycle; and wherein removing the low-pressure tail gas stream comprises removing the low-pressure tail gas stream during at least one of a counter-current depressurization step, and a counter-current purge step in the PSA cycle.

In some embodiments, the PSA cycle comprises:
a high pressure, co-current adsorption and product removal step;
at least one co-current depressurization step following the high pressure, co-current adsorption step and product removal step;
an intermediate pressure co-current depressurization and vent gas removal step following the at least one co-current depressurization step;
a counter-current blowdown step and tail gas removal step following the intermediate pressure co-current depressurization and vent gas removal step;
a counter-current purge and tail gas removal step following the counter-current blowdown step; and
at least one counter-current re-pressurization step following the counter-current purge and tail gas removal step.

In some embodiments, the method further comprises: a co-current feed re-pressurization step following the at least one counter-current re-pressurization step, or a counter-current product re-pressurization following the at least one counter-current re-pressurization step.

In some embodiments, at least one of: the high-pressure product stream is removed at a pressure in the range of about 1,000 kPa to about 6,000 kPa; the intermediate-pressure vent gas stream is removed at a pressure in the range of about 150 kPa to about 450 kPa; and the low-pressure tail gas stream is removed at a pressure in the range of about 100 kPa to about 250 kPa.

Another aspect of the invention is a three-product PSA unit. In one embodiment, the three-product PSA unit comprises: a PSA adsorption vessel having a first end and a second end, the PSA adsorption vessel comprising a at least one adsorbent layer, the PSA adsorption vessel having a first opening at the first end and a second opening at the second end, the first opening being in selective fluid communication with a high pressure feed gas inlet line and a low pressure heavy key component outlet line, the second opening being in selective fluid communication with a high pressure product outlet line, an intermediate pressure vent gas outlet line, and a low pressure purge gas inlet line.

In a specific application, the three-product PSA unit produces high-purity hydrogen in a high-pressure product stream, a low-pressure tail gas stream comprising $CO_2$ and some impurities, and an intermediate pressure vent gas stream containing the majority of the impurities. The intermediate pressure vent gas stream has a pressure between the other two streams. The $CO_2$-rich tail gas stream can be compressed and sent to a $CO_2$ recovery system, where a high-purity liquid $CO_2$ stream is recovered. The impurity-rich intermediate pressure vent gas stream can be combusted in a fired heater or waste heat boiler to generate heat and steam for the upstream process. A portion may be recycled upstream to a reformer or water-gas shift reactor(s) for further reaction of impurities and recovery of hydrogen.

When the feed gas mixture is the reaction mixture effluent stream from a hydrogen production process, the light key component is hydrogen; the heavy key component is carbon dioxide; and the intermediate key component is at least one of methane, carbon monoxide, nitrogen, and argon.

When the feed gas mixture is a fluid catalytic cracking (FCC) off gas stream, the light key component is hydrogen;

the heavy key component is ethylene; and the intermediate key component is at least one of methane and nitrogen.

Utilizing a three-product PSA system instead of a conventional two-product PSA unit avoids the build-up of impurities in the process and eliminates the need to take a physical bleed stream to purge impurities which would result in the loss of valuable hydrogen in the bleed stream.

In a particular process, the feed gas mixture may be the effluent from a hydrogen production process. The effluent comprises hydrogen as the light key component, $CO_2$ as the heavy key component and at least one of carbon monoxide, methane, nitrogen, and argon as the intermediate key component. The effluent may be separated in a conventional PSA unit into a hydrogen stream and a tail gas stream. The tail gas stream may be compressed and separated in the distillation column of a $CO_2$ recovery unit into a bottom stream comprising $CO_2$ and an overhead stream comprising hydrogen, $CO_2$, and at least one of carbon monoxide, methane, nitrogen, and argon. The overhead stream is sent to the three-product PSA unit where it produces pure hydrogen at high pressure, a low pressure $CO_2$ rich tail gas stream, and an intermediate pressure vent gas stream comprising the carbon monoxide, methane, nitrogen, and argon, as well as unrecovered hydrogen (about 10% of hydrogen in the incoming overhead stream).

Extracting pure hydrogen directly from the overhead stream with the three-product PSA system has the potential to provide an economic advantage over systems that use recycle configurations. The additional hydrogen production substantially improves the process economics. Using a three-product PSA unit on the distillation column overhead stream avoids non-permeate losses of $CO_2$ which occur with the use of a membrane separation process. Utilizing a three-product PSA system offers innovation and flexibility, reducing downstream equipment size and utilities, and increasing $CO_2$ captured (since the impurity-rich purge stream contains no significant $CO_2$).

FIG. 1 illustrates a PSA unit 5 comprising a PSA adsorption vessel 10. The vessel 10 includes three adsorption layers 15, 20, 25. The vessel 10 includes a first opening 30 at a first end 35 and a second opening 40 at a second end 45. The opening 30 is in selective fluid communication with high pressure feed gas inlet line 50 via valve 55 and with low pressure tail gas outlet line 60 via valve 65. The second opening 40 is in selective fluid communication with high pressure product outlet line 70 via valve 75, intermediate pressure vent gas outlet line 80 via valve 85, and low pressure purge gas inlet line 90 via valve 95.

During the high pressure, co-current adsorption and product removal step of the PSA cycle, valves 55 and 75 are open and valves 65, 85, and 95 are closed, allowing the high pressure feed gas to enter the vessel 10 and the high pressure product stream to exit.

During the at least one co-current depressurization step, valves 55, 65, 75, 85, and 95 are closed.

During the intermediate pressure co-current depressurization and vent removal step, valve 85 is open, and valves 55, 65, 75, and 95 are closed.

During the counter-current blowdown step and tail gas removal step, valve 65 is open, and valves 55, 75, 85, and 95 are closed. The bed de-pressurizes through valve 65, and some of the $CO_2$ is desorbed.

During the counter-current purge and tail gas removal step, valves 65 and 95 are open, and valves 55, 75, and 85 are closed. The purge gas is introduced, and the $CO_2$ is removed.

During the at least one counter-current re-pressurization step, valves 55, 65, 75, 85, and 95 are closed.

Figure 2:
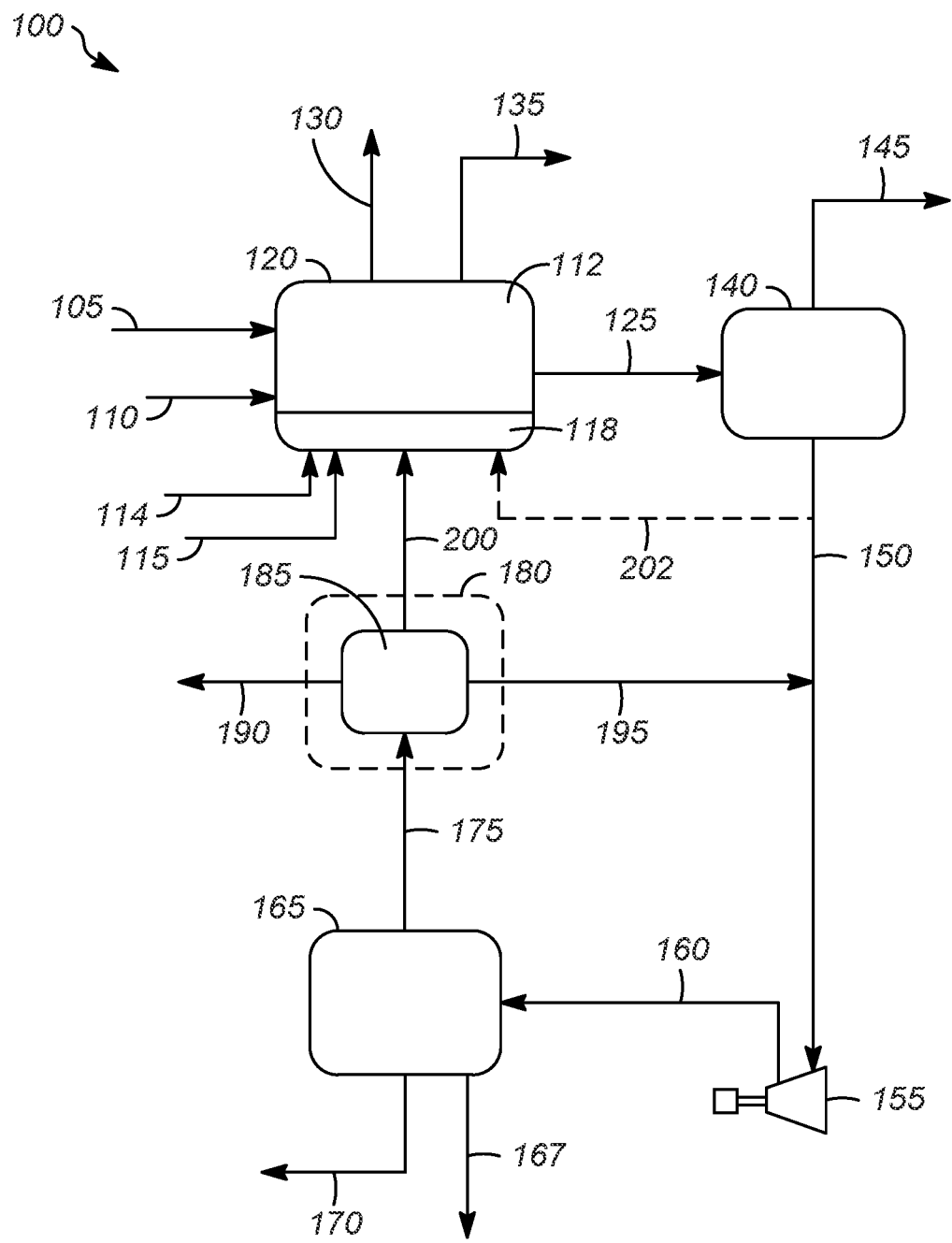
FIG. 2 is an illustration of one embodiment of a method for $CO_2$ recovery from an existing steam reforming hydrogen production process and of increasing hydrogen production using the three-product PSA unit of the present invention.

FIG. 2 illustrates one embodiment of a hydrogen production process 100 incorporating the three-product PSA unit of the present invention. Natural gas 105 and water 110 are sent to the reaction section 112 of the existing steam reforming process unit 120, and assist fuel gas 114 and air 115 are sent to a furnace in the steam reforming process unit 120. Other hydrocarbon feed streams could be used instead of natural gas including, but not limited to, naphtha and liquefied petroleum gas (LPG). The assist fuel gas is an extra fuel source to provide stability and enough heat for the reforming reaction because the PSA tail gas or vent gas does not provide enough heat to drive the process. Suitable assist fuel gases include, but are not limited to, natural gas, and other largely hydrocarbon containing fuels, such as refinery fuel gas, petrochemical complex synthesized fuel gas, vaporized naphtha or vaporized liquefied petroleum gas (LPG), or blends of hydrocarbon containing fuels with hydrogen, up to and including raw or pure hydrogen.

The steam reforming and water-gas shift reactions produce an effluent stream 125 comprising hydrogen, $CO_2$, water and at least one of methane, carbon monoxide, and nitrogen. Flue gas stream 130 and steam stream 135 also exit the steam reforming process unit 120.

Effluent stream 125 has a temperature of or about 30° C. to about 50° C. (after heat recovery and cooling in the steam reforming process), and a pressure of about 2,000 to about 3,000 kPa. Effluent stream 125 is sent to the hydrogen PSA unit 140 where it is separated into a high purity hydrogen stream 145 enriched in hydrogen and a hydrogen depleted tail gas stream 150 comprising a portion of the hydrogen, the $CO_2$, the water, and the at least one of methane, carbon monoxide, and nitrogen.

The tail gas stream 150 is sent to compressor 155 where it is compressed from a pressure in the range of about 110 kPa to about 150 kPa to a pressure in the range of 3,000 kPa to about 6,000 kPa.

Compressed tail gas stream 160 is sent to a $CO_2$ recovery unit 165 where it is dried to remove water stream 167, cooled to a temperature of about −20° C. to about −50° C., and separated into a bottoms stream 170 and an overhead stream 175. The bottoms stream 170 comprising liquid $CO_2$ is recovered.

The overhead stream 175 is sent to the three-product PSA system 180 comprising a three-product PSA unit 185 where it is separated into three streams. A high pressure hydrogen stream 190 is recovered. A low pressure $CO_2$ stream 195 is recycled to the compressor 155. Intermediate pressure vent gas stream 200 comprising at least one of the methane, carbon monoxide, and nitrogen is sent to the steam reforming process unit 120 as fuel.

Bypass line 202 sends the tail gas stream 150 to the furnace 118 in the existing steam reforming process unit 120 for combustion. This allows the steam reforming process unit 120 to continue operating without recovery of $CO_2$ in the event of a problem with the compressor 155, the $CO_2$ recovery unit 165, or the three-product PSA system 180.

Figure 3:
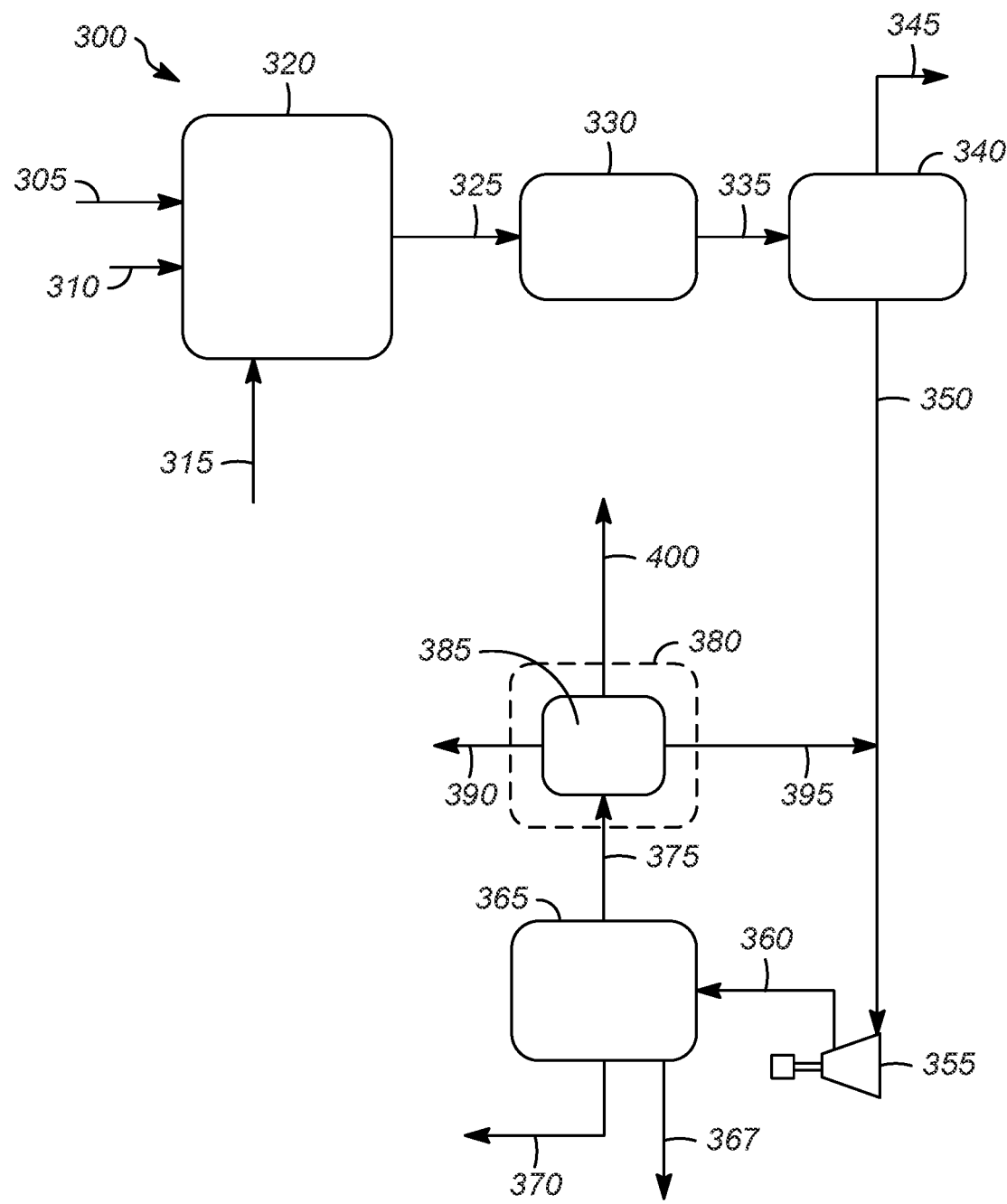
FIG. 3 is an illustration of another embodiment of a method of $CO_2$ recovery and hydrogen production using the three-product PSA unit of the present invention.

FIG. 3 illustrates another embodiment of a hydrogen production process 300 incorporating the three-product PSA unit of the present invention. Natural gas 305, water 310, and oxygen 315 are sent to the ATR/GHR process 320. The steam reforming and partial oxidation reactions produce a syngas effluent stream 325 which is sent to the water gas shift reaction unit 330. The effluent 335 from the water gas shift reaction unit 330 comprises hydrogen, $CO_2$, water, and at least one of methane, carbon monoxide, nitrogen, and argon.

Effluent 335 is sent to PSA unit 340 where it is separated into a high purity hydrogen stream 345 enriched in hydrogen and a hydrogen depleted tail gas stream 350 comprising a portion of the hydrogen, the $CO_2$, the water, and at least one of methane, carbon monoxide, nitrogen, and argon.

The tail gas stream 350 is sent to compressor 355. Compressed tail gas stream 360 is sent to the $CO_2$ recovery unit 365 for drying to remove water stream 367, cooling, and separation into a bottoms stream 370 and an overhead stream 375. The bottoms stream 370 comprising liquid $CO_2$ is recovered.

The overhead stream 375 is sent to the three-product PSA system 380 comprising a three-product PSA unit 385 where it is separated into three streams. A high pressure hydrogen stream 390 is recovered. A low pressure $CO_2$ stream 395 is recycled to the compressor 355. Intermediate pressure vent gas stream 400 comprising at least one of methane, carbon monoxide, nitrogen, and argon is sent to a furnace as fuel.

Example 1—Three Product PSA System Comprising a Three Product PSA Unit

Tables 1-5 provide the results for a three product PSA system comprising a three-product PSA unit.

Table 1 shows a 10-bed cycle with 3 pressure equalization steps. Table 2 provides a detailed description of the 10-bed PSA cycle in Table 1.

These cycles were used in an experimental pilot plant test of the three product PSA unit shown Tables 3-5.

TABLE 1

| | ADS | |
|---|---|---|
| EQ1D | | EQ2D |
| EQ3D | | PP |
| PP | | VENT |
| | VENT | |
| BD | | PURGE |
| | PURGE | |
| EQ3U | | EQ2U |
| EQ1U | | FREP |
| | FREP | |

TABLE 2

| Step | Abbreviation | Flow Direction | Time * | Starting Pressure, kPa | Ending Pressure, kPa |
|---|---|---|---|---|---|
| Adsorption | ADS | Up | x | 4400 | 4400 |
| Equalization 1 | EQ1D | Up | 0.5x | 4400 | 2850 |
| Equalization 2 | EQ2D | Up | 0.5x | 2850 | 1600 |
| Equalization 3 | EQ3D | Up | 0.5x | 1600 | 1070 |
| Provide Purge | PP | Up | x | 1070 | 820 |
| Vent | VENT | Up | 1.5x | 820 | 275 |
| Blowdown | BD | Down | 0.5x | 275 | 150 |
| Purge | PURGE | Down | 1.5x | 150 | 150 |
| Equalization 3 | EQ3U | Down | 0.5x | 150 | 550 |
| Equalization 2 | EQ2U | Down | 0.5x | 550 | 1600 |
| Equalization 1 | EQ1U | Down | 0.5x | 1600 | 2850 |
| Feed Repressurization | FREP | Up | 1.5x | 2850 | 4400 |

* x = sub-cycle time (ranges from 30 to 120 seconds)

The feed gas composition is shown in Table 3, and the bed loading is given in Table 4. As shown in Table 5, the high pressure hydrogen stream contains 82.5% of the hydrogen in the incoming overhead stream, and none of the $CO_2$, CO, $CH_4$, or nitrogen. The low-pressure $CO_2$ stream contains all of the $CO_2$, 8.8% of the hydrogen, 30.8% of the CO, 49.8% of the $CH_4$, and 11.4% of the nitrogen. The intermediate-pressure vent gas stream contains 8.7% of the hydrogen, 69.2% of the CO, 50.2% of the $CH_4$, 88.6% of the nitrogen, and no $CO_2$.

TABLE 3

| | Feed Gas, Mol % |
|---|---|
| Hydrogen | 40 |
| Carbon Monoxide | 14 |
| Methane | 22 |
| Carbon Dioxide | 22 |
| Nitrogen | 2 |

Pressure: 4400 kPa
Temperature: 40° C.

TABLE 4

| | Bed Loading, Vol % |
|---|---|
| 5A Zeolite (top) | 40 |
| NaY Zeolite | 20 |
| Activated Carbon | 20 |
| Silica Gel (bottom) | 20 |

TABLE 5

| | % Recovery from Feed | | | |
|---|---|---|---|---|
| | Product | Tail Gas | Vent | Total |
| Hydrogen | 82.5 | 8.8 | 8.7 | 100.0 |
| Carbon Monoxide | 0.0 | 30.8 | 69.2 | 100.0 |
| Methane | 0.0 | 49.8 | 50.2 | 100.0 |
| Carbon Dioxide | 0.0 | 100.0 | 0.0 | 100.0 |
| Nitrogen | 0.0 | 11.4 | 88.6 | 100.0 |

As used herein, the term "stream" can include various hydrocarbon molecules and other substances.

As used herein, the term "stream", "feed", "product", "part" or "portion" can include various hydrocarbon molecules, such as straight-chain and branched alkanes, naphthenes, alkenes, alkadienes, and alkynes, and optionally other substances, such as gases, e.g., hydrogen, or impurities, such as heavy metals, and sulfur and nitrogen compounds. Each of the above may also include aromatic and non-aromatic hydrocarbons.

As used herein, the term "overhead stream" can mean a stream withdrawn at or near a top of a vessel, such as a distillation column.

As used herein, the term "bottoms stream" can mean a stream withdrawn at or near a bottom of a vessel, such as a distillation column.

As used herein, the term "unit" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated or pre-chilled. The top or overhead pressure is the pressure of the overhead vapor at the vapor outlet of the column. The bottom temperature is the liquid bottom outlet temperature. Net overhead lines and net bottoms lines refer to the net lines from the column downstream of any reflux or reboil to the column unless otherwise shown. Stripping columns may omit a reboiler at a bottom of the column and instead provide heating requirements and separation impetus from a fluidized inert media such as steam.

As depicted, process flow lines in the drawings can be referred to interchangeably as, e.g., lines, pipes, feeds, gases, products, discharges, parts, portions, or streams.

The term "passing" means that the material passes from a conduit or vessel to an object.

As used herein, the term "about" means within 10% of the value, or within 5%, or within 1%.

Specific Embodiments

While the following is described in conjunction with specific embodiments, it will be understood that this description is intended to illustrate and not limit the scope of the preceding description and the appended claims.

A first embodiment of the invention is a method of separating a feed gas mixture comprising a light key component, at least one heavy key component, and at least one intermediate key component comprising introducing the feed gas mixture to a three-product pressure swing adsorption (PSA) system having a PSA cycle, the three-product PSA system comprising a three-product PSA unit; removing a high-pressure product stream enriched in the light key component, wherein the high-pressure product stream is substantially free of the at least one intermediate key component and the at least one heavy key component; removing an intermediate pressure vent gas stream enriched in the at least one intermediate key component; removing a low pressure tail gas stream enriched in the at least one heavy key component. An embodiment of the invention is one, any or all of prior embodiments in this paragraph up through the first embodiment in this paragraph wherein the three-product PSA system comprises a three-product PSA unit: removing the high-pressure product stream during a high pressure, co-current adsorption step in the PSA cycle; removing the intermediate-pressure vent gas stream during an intermediate pressure co-current depressurization step in the PSA cycle; and removing the low-pressure tail gas stream during at least one of a counter-current depressurization step, and a counter-current purge step in the PSA cycle. An embodiment of the invention is one, any or all of prior embodiments in this paragraph up through the first embodiment in this paragraph wherein the PSA cycle comprises a high pressure, co-current adsorption and product removal step; at least one co-current depressurization step following the high pressure, co-current adsorption and product removal step; an intermediate pressure co-current depressurization and vent gas removal step following the at least one co-current depressurization step; a counter-current blowdown step and tail gas removal step following the intermediate pressure co-current depressurization and vent gas removal step; a counter-current purge and tail gas removal step following the counter-current blowdown step; and at least one counter-current re-pressurization step following the counter-current purge and tail gas removal step. An embodiment of the invention is one, any or all of prior embodiments in this paragraph up through the first embodiment in this paragraph further comprising a co-current feed re-pressurization step following the at least one counter-current re-pressurization step or a counter-current product re-pressurization following the at least one counter-current re-pressurization step. An embodiment of the invention is one, any or all of prior embodiments in this paragraph up through the first embodiment in this paragraph wherein the high-pressure product stream is removed at a pressure in the range of about 1,000 kPa to about 6,000 kPa. An embodiment of the invention is one, any or all of prior embodiments in this paragraph up through the first embodiment in this paragraph wherein the intermediate-pressure vent gas stream is removed at a pressure in the range of about 150 kPa to about 450 kPa. An embodiment of the invention is one, any or all of prior embodiments in this paragraph up through the first embodiment in this paragraph wherein the low-pressure tail gas stream is removed at a pressure in the range of about 100 kPa to about 250 kPa. An embodiment of the invention is one, any or all of prior embodiments in this paragraph up through the first embodiment in this paragraph wherein the light key component is hydrogen. An embodiment of the invention is one, any or all of prior embodiments in this paragraph up through the first embodiment in this paragraph wherein the at least one heavy key component is at least one of carbon dioxide and ethylene. An embodiment of the invention is one, any or all of prior embodiments in this paragraph up through the first embodiment in this paragraph wherein the at least one intermediate key component is at least one of methane, carbon monoxide, nitrogen, and argon. An embodiment of the invention is one, any or all of prior embodiments in this paragraph up through the first embodiment in this paragraph wherein the light key component is hydrogen; wherein the at least one heavy key component is at least one of carbon dioxide and ethylene; and wherein the at least one intermediate key component is at least one of methane, carbon monoxide, nitrogen, and argon.

A second embodiment of the invention is a method of separating a feed gas mixture comprising hydrogen, at least one of carbon dioxide and ethylene, and at least one of methane, carbon monoxide, nitrogen, and argon comprising introducing the feed gas mixture to a three-product pressure swing adsorption (PSA) system having a PSA cycle, the three-product PSA system comprising a three-product PSA unit; removing a high-pressure product stream enriched in the hydrogen, wherein the high-pressure product stream is substantially free of the at least one of the carbon dioxide and the ethylene, and the at least one of the methane, the carbon monoxide, the nitrogen, and the argon; removing an intermediate-pressure vent gas stream enriched in the at least one of the carbon monoxide, methane, nitrogen, and argon through an outlet on the same side of the adsorption bed as the high-pressure product; and removing a low-pressure tail gas stream enriched in the at least one of the carbon dioxide and ethylene. An embodiment of the invention is one, any or all of prior embodiments in this paragraph up through the second embodiment in this paragraph wherein removing the high-pressure product stream comprises removing the high-pressure product stream during a high pressure, co-current adsorption step in the PSA cycle; wherein removing the intermediate-pressure vent gas stream comprises removing the intermediate-pressure vent gas stream during an intermediate pressure co-current depressurization step in the PSA cycle; and wherein removing the low-pressure tail gas stream comprises removing the low-pressure tail gas stream during at least one of a counter-current depressurization step, and a counter-current purge step in the PSA cycle. An embodiment of the invention is one, any or all of prior embodiments in this paragraph up through the second embodiment in this paragraph wherein the PSA cycle comprises a high pressure, co-current adsorption and product removal step; at least one co-current depressurization step following the high pressure, co-current adsorption step and product removal step; an intermediate pressure co-current depressurization and vent gas removal step following the at least one co-current depressurization step; a counter-current blowdown step and tail gas removal step following the intermediate pressure co-current depressurization and vent gas removal step; a counter-current purge and tail gas removal step following the counter-current blowdown step; and at least one counter-current re-pressurization step following the counter-current purge and tail gas removal step. An embodiment of the invention is one, any or all of prior embodiments in this paragraph up through the second embodiment in this paragraph further comprising a co-current feed re-pressurization step following the at least one counter-current re-pressurization step, or a counter-current product re-pressurization following the at least one counter-current re-pressurization step. An embodiment of the invention is one, any or all of prior embodiments in this paragraph up through the second embodiment in this paragraph wherein at least one of the high-pressure product stream is removed at a pressure in the range of about 1,000 kPa to about 6,000 kPa; the intermediate-pressure vent gas stream is removed at a pressure in the range of about 150 kPa to about 450 kPa; and the low-pressure tail gas stream is removed at a pressure in the range of about 100 kPa to about 250 kPa.

A third embodiment of the invention is an apparatus comprising a PSA adsorption vessel having a first end and a second end, the PSA adsorption vessel comprising a at least one adsorbent layer, the PSA adsorption vessel having a first opening at the first end and a second opening at the second end, the first opening being in selective fluid communication with a high pressure feed gas inlet line and a low pressure heavy key component outlet line, the second opening being in selective fluid communication with a high pressure product outlet line, an intermediate pressure vent gas outlet line, and a low pressure purge gas inlet line.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A method of separating a feed gas mixture comprising a light key component, at least one heavy key component, and at least one intermediate key component comprising:
   introducing the feed gas mixture to a three-product pressure swing adsorption (PSA) system having a PSA cycle, the three-product PSA system comprising a three-product PSA unit;
   removing a high-pressure product stream enriched in the light key component, wherein the high-pressure product stream is substantially free of the at least one intermediate key component and the at least one heavy key component;
   removing an intermediate-pressure vent gas stream enriched in the at least one intermediate key component;
   removing a low-pressure tail gas stream enriched in the at least one heavy key component.

2. The method of claim 1 wherein the three-product PSA system comprises a three-product PSA unit:
   removing the high-pressure product stream during a high pressure, co-current adsorption step in the PSA cycle;
   removing the intermediate-pressure vent gas stream during an intermediate pressure co-current depressurization step in the PSA cycle; and
   removing the low-pressure tail gas stream during at least one of a counter-current depressurization step, and a counter-current purge step in the PSA cycle.

3. The method of claim 1 wherein the PSA cycle comprises:
   a high pressure, co-current adsorption and product removal step;
   at least one co-current depressurization step following the high pressure, co-current adsorption and product removal step;
   an intermediate pressure co-current depressurization and vent gas removal step following the at least one co-current depressurization step;
   a counter-current blowdown step and tail gas removal step following the intermediate pressure co-current depressurization and vent gas removal step;
   a counter-current purge and tail gas removal step following the counter-current blowdown step; and
   at least one counter-current re-pressurization step following the counter-current purge and tail gas removal step.

4. The method of claim 3 further comprising:
   a co-current feed re-pressurization step following the at least one counter-current re-pressurization step or a counter-current product re-pressurization following the at least one counter-current re-pressurization step.

5. The method of claim 1 wherein the high-pressure product stream is removed at a pressure in the range of about 1,000 kPa to about 6,000 kPa.

6. The method of claim 1 wherein the intermediate-pressure vent gas stream is removed at a pressure in the range of about 150 kPa to about 450 kPa.

7. The method of claim 1 wherein the low-pressure tail gas stream is removed at a pressure in the range of about 100 kPa to about 250 kPa.

8. The method of claim 1 wherein the light key component is hydrogen.

9. The method of claim 1 wherein the at least one heavy key component is at least one of carbon dioxide and ethylene.

10. The method of claim 1 wherein the at least one intermediate key component is at least one of methane, carbon monoxide, nitrogen, and argon.

11. The method of claim 1 wherein the light key component is hydrogen; wherein the at least one heavy key component is at least one of carbon dioxide and ethylene; and wherein the at least one intermediate key component is at least one of methane, carbon monoxide, nitrogen, and argon.

12. A method of separating a feed gas mixture comprising hydrogen, at least one of carbon dioxide and ethylene, and at least one of methane, carbon monoxide, nitrogen, and argon comprising:
- introducing the feed gas mixture to a three-product pressure swing adsorption (PSA) system having a PSA cycle, the three-product PSA system comprising a three-product PSA unit;
- removing a high-pressure product stream enriched in the hydrogen, wherein the high-pressure product stream is substantially free of the at least one of the carbon dioxide and the ethylene, and the at least one of the methane, the carbon monoxide, and the nitrogen, and the argon;
- removing an intermediate-pressure vent gas stream enriched in the at least one of the carbon monoxide, the methane, the nitrogen, and the argon through an outlet on the same side of the adsorption bed as the high-pressure product; and
- removing a low-pressure tail gas stream enriched in the at least one of the carbon dioxide and ethylene.

13. The method of claim 12:
- wherein removing the high-pressure product stream comprises removing the high-pressure product stream during a high pressure, co-current adsorption step in the PSA cycle;
- wherein removing the intermediate-pressure vent gas stream comprises removing the intermediate-pressure vent gas stream during an intermediate pressure co-current depressurization step in the PSA cycle; and
- wherein removing the low-pressure tail gas stream comprises removing the low-pressure tail gas stream during at least one of a counter-current depressurization step, and a counter-current purge step in the PSA cycle.

14. The method of claim 12 wherein the PSA cycle comprises:
- a high pressure, co-current adsorption and product removal step;
- at least one co-current depressurization step following the high pressure, co-current adsorption step and product removal step;
- an intermediate pressure co-current depressurization and vent gas removal step following the at least one co-current depressurization step;
- a counter-current blowdown step and tail gas removal step following the intermediate pressure co-current depressurization and vent gas removal step;
- a counter-current purge and tail gas removal step following the counter-current blowdown step; and
- at least one counter-current re-pressurization step following the counter-current purge and tail gas removal step.

15. The method of claim 14 further comprising:
- a co-current feed re-pressurization step following the at least one counter-current re-pressurization step, or a counter-current product re-pressurization following the at least one counter-current re-pressurization step.

16. The method of claim 14 wherein at least one of:
- the high-pressure product stream is removed at a pressure in the range of about 1,000 kPa to about 6,000 kPa;
- the intermediate-pressure vent gas stream is removed at a pressure in the range of about 150 kPa to about 450 kPa; and
- the low-pressure tail gas stream is removed at a pressure in the range of about 100 kPa to about 250 kPa.

* * * * *